United States Patent
Dai et al.

(10) Patent No.: US 10,177,810 B2
(45) Date of Patent: Jan. 8, 2019

(54) SYSTEMS AND METHODS FOR ECHO OR INTERFERENCE CANCELLATION POWER-SAVING MANAGEMENT IN A COMMUNICATION SYSTEM

(71) Applicant: Marvell World Trade Ltd., St. Michael (BB)

(72) Inventors: Shaoan Dai, San Jose, CA (US); Kok-Wui Cheong, Los Altos, CA (US); Zhenzhong Gu, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 15/664,621

(22) Filed: Jul. 31, 2017

(65) Prior Publication Data

US 2018/0069595 A1    Mar. 8, 2018

Related U.S. Application Data

(60) Provisional application No. 62/383,117, filed on Sep. 2, 2016.

(51) Int. Cl.
| | | |
|---|---|---|
| *H04B 3/20* | (2006.01) | |
| *H04B 3/493* | (2015.01) | |
| *H04B 1/38* | (2015.01) | |
| *H04B 3/04* | (2006.01) | |

(52) U.S. Cl.
CPC ............... *H04B 3/20* (2013.01); *H04B 1/38* (2013.01); *H04B 3/04* (2013.01); *H04B 3/493* (2015.01)

(58) Field of Classification Search
CPC ... H04B 3/20; H04B 1/38; H04B 3/04; H04B 3/493
See application file for complete search history.

(56) References Cited

U.S. PATENT DOCUMENTS

| | | | |
|---|---|---|---|
| 6,760,436 B1* | 7/2004 | Takada ................ | H04M 9/082 379/406.01 |
| 2002/0119753 A1* | 8/2002 | Digiandomenico ..... | H04B 3/23 455/570 |
| 2004/0114542 A1* | 6/2004 | Stopler .................. | H04B 3/23 370/286 |
| 2007/0280388 A1* | 12/2007 | Torre .................... | H04B 3/23 375/350 |
| 2011/0150067 A1* | 6/2011 | Takada ................ | H04M 9/082 375/227 |

(Continued)

*Primary Examiner* — Syed Haider

(57) ABSTRACT

Embodiments described herein provide echo cancellation power saving management at a cable transceiver. An echo response signal having a first number of signal components is obtained, via an echo cancellation filter. At a first iteration for calculating a first accumulative echo power, a respective echo tap that corresponds to the first iteration is identified. The first accumulative echo power is calculated for the respective iteration by summing powers of outputs from a last echo tap to the respective echo tap. It is then determined whether the first accumulative echo power, exceeds a pre-determined echo power threshold. If the first accumulative echo power exceeds the pre-determined echo power threshold, a first turn-off indication is sent to the echo cancellation filter to turn off all echo taps including and between the last echo tap to the first echo tap.

20 Claims, 6 Drawing Sheets

(56) References Cited

U.S. PATENT DOCUMENTS

2013/0177162 A1\* 7/2013 Lim .................... G10L 21/0208
                                                    381/66
2016/0050031 A1\* 2/2016 Hwang ................. H04B 1/525
                                                    375/219

\* cited by examiner

SYSTEMS AND METHODS FOR ECHO OR INTERFERENCE CANCELLATION POWER-SAVING MANAGEMENT IN A COMMUNICATION SYSTEM

CROSS-REFERENCE TO RELATED APPLICATION

This application claims the benefit under 35 U.S.C. § 119(e) of U.S. Provisional Patent Application No. 62/383,117, filed Sep. 2, 2016, which is hereby incorporated by reference herein in its entirety.

FIELD OF USE

This disclosure relates to power management of a cable communication system, and specifically, echo or interference cancellation power-saving management in a cable communication system.

BACKGROUND OF THE DISCLOSURE

The background description provided herein is for the purpose of generally presenting the context of the disclosure. Work of the inventors hereof, to the extent the work is described in this background section, as well as aspects of the description that do not otherwise qualify as prior art at the time of filing, are neither expressly nor impliedly admitted to be prior art against the present disclosure.

High-speed Ethernet communication is commonly used for computer networking and in recent years has been adapted for use in automotive environments. For example, an automotive cable is often used to connect sub-systems of an automobile, including for example engine, braking, steering, safety and various sensor sub-systems. Performance of data transmission along such automotive cable is at times impacted by various factors such as signal reflection or electromagnetic interference (EMI).

For example, when a signal is transmitted along a transmission medium, such as a copper cable or an optical fiber, due to non-linear changes in the cable characteristics (e.g., impedance mismatch of a copper cable or imperfections in the glass of an optical fiber, etc.) of the cable, some of the signal power is reflected back to the transmitter rather than being carried all the way along the cable to the far-end receiver. Such reflected signal is usually received by a transceiver together with another signal sent through the cable from the far-end receiver, and thus affects the decoding of the received signal. As another example, EMI, which affects an electrical circuit in the cable communication system by electromagnetic induction, electrostatic coupling or conduction, and/or the like, often disturbs signal transmission as well.

Thus, cable communication systems are usually subject to stringent EMI and echo requirements in order to provide reliable and efficient transfer of data among the various automobile sub-systems. To deal with the EMI and echo performance requirements, interference cancellation and/or echo cancellation is used in a digital signal processing (DSP) based automotive transceiver. However, the implementation of interference cancellation and/or echo cancellation often incurs significant power consumption in a high speed communication system, thereby impacting the deployment of high speed communication systems in some applications such as automotive applications.

SUMMARY

Embodiments described herein provide echo cancellation power saving management at a cable transceiver. In some embodiments, an echo response signal having a first number of signal components is obtained, via an echo cancellation filter. The first number is equivalent to a number of echo taps in the echo cancellation filter. At a first iteration for calculating a first accumulative echo power, a respective echo tap that corresponds to the first iteration is identified. The first accumulative echo power is calculated for the respective iteration by summing powers of outputs from a last echo tap to the respective echo tap. It is then determined whether the first accumulative echo power, exceeds a pre-determined echo power threshold. If the first accumulative echo power exceeds the pre-determined echo power threshold, a first turn-off indication is sent to the echo cancellation filter to turn off all echo taps including and between the last echo tap to the first echo tap.

In some implementations, a first signal is transmitted to a data communication link. In response to the transmitting, a second signal including echo components corresponding to the first signal is received from the data communication link. An echo estimate is generated, by the echo cancellation filter, based on the first signal to cancel the echo components from the second signal. The echo response signal is generated, by an adaptation engine, by adapting coefficients of echo components of the second signal to minimize an energy of the echo components.

In some implementations, in response to determining that the first accumulative echo power exceeds the pre-determined echo threshold, a second turn-off indication is sent to turn off taps of the adaptation engine corresponding to echo taps including and between the last echo tap to the first echo tap.

In some implementations, an absolute value of a coefficient of an echo tap is calculated as the power of the echo tap.

In some implementations, a square value of a coefficient of an echo tap is calculated as the power of the echo tap.

In some implementations, a turn-on indication is periodically sent to temporarily turn on all echo taps of the echo cancellation filter. A second accumulative echo power is iteratively calculated based on a newly obtained echo response signal by: at a second iteration for calculating the second accumulative echo power, a second echo tap that corresponds to the second iteration is identified. The second accumulative echo power is calculated for the second iteration by summing powers of outputs from the last echo tap to the second echo tap. It is then determined whether the second accumulative echo power exceeds the pre-determined echo power threshold. An indication is sent to adjust the echo cancellation filter in a way that all echo taps including and between the last echo tap to the second echo tap are turned off.

In some implementations, a received signal is sent to an interference cancellation filter to cancel electric magnetic interference components. An interference response signal having a second number of signal components indicative of interference in the received signal is obtained. The second number is equivalent to a number of interference cancellation taps in the interference cancellation filter. A summed power of the second number of signal components is calculated. The summed power of the second number of signal components is indicative of an interference level of the received signal. It is determined whether the summed power of the second number of signal components exceeds a pre-determined interference threshold. If the summed power of the second number of signal components does not exceed the pre-determined interference threshold, a second turn-off indication is sent to turn off the interference cancellation filter.

In some implementations, an absolute value or a square of a coefficient of each interference cancellation tap is calculated. The absolute value or the square is added among all interference cancellation taps.

In some implementations, a turn-on indication is periodically sent to temporarily turn on the interference cancellation filter. It is determined whether the summed power of the second number of signal components corresponding to a newly received signal exceeds the pre-determined interference threshold. If the summed power of the second number of signal components corresponding to the newly received signal does not exceed the pre-determined interference threshold, the second turn-off indication is sent to turn off the interference cancellation filter. If the summed power of the second number of signal components corresponding to the newly received signal exceeds the pre-determined interference threshold, the interference cancellation filter is kept in operation.

In some implementations, interference cancellation power management is operated in parallel to echo cancellation power management.

Embodiments described herein provide a system for echo cancellation power saving management at a cable transceiver. The system comprises an echo cancellation filter having a number of echo taps, an echo power calculator, and an echo power management module. The echo cancellation filter is configured to provide an echo response signal having a first number of signal components, and the first number is equivalent to the number of echo taps. The echo power calculator is configured to: at a first iteration for calculating a first accumulative echo power, identify a respective echo tap that corresponds to the first iteration. The first accumulative echo power for the respective iteration is calculated by summing powers of outputs from a last echo tap to the respective echo tap. It is determined whether the first accumulative echo power exceeds a pre-determined echo power threshold. The echo power management module is configured to, in response to determining that the first accumulative echo power exceeds the pre-determined echo power threshold, send a first turn-off indication to the echo cancellation filter to turn off echo taps including and between the last echo tap to the first echo tap.

In some implementations, the system includes a transmitter, a receiver, and an adaptation engine. The transmitter is configured to transmit a first signal to a data communication link. The receiver is configured to, in response to the transmitting, receive a second signal including echo components corresponding to the first signal from the data communication link. The echo cancellation filter is further configured to generate an echo estimate based on the first signal to cancel the echo components from the second signal. The adaptation engine is configured to generate the echo response signal by adapting coefficients of echo components of the second signal to minimize an energy of the echo components.

In some implementations, the echo power management module is further configured to: in response to determining that the first accumulative echo power exceeds the pre-determined threshold, send a second turn-off indication to turn off taps of the adaptation engine corresponding to echo taps including and between the last echo tap to the first echo tap.

In some implementations, the echo power calculator is further configured, when calculating an accumulative echo power, to calculate an absolute value or a square of a coefficient of an echo tap as the power of the echo tap.

In some implementations, the echo power management module is further configured to periodically send a turn-on indication to temporarily turn on the echo cancellation filter. The echo power calculator is further configured to iteratively calculate the accumulative echo power based on a newly obtained echo response signal by: at a second iteration for calculating the second accumulative echo power: identifying a second echo tap that corresponds to the second iteration, calculating the second accumulative echo power for the second iteration by summing powers of outputs from the last echo tap to the second echo tap, and determining whether the second accumulative echo power, exceeds the pre-determined echo power threshold. The echo power management module is further configured to send an indication to adjust the echo cancellation filter in a way that all echo taps including and between the last echo tap to the second echo tap are turned off.

In some implementations, the system further includes an interference cancellation filter having a number of interference cancellation taps, an interference power calculator, and an interference power management module. The interference cancellation filter is configured to cancel electric magnetic interference components from a received signal. The interference power calculator is configured to: obtain, an interference response signal having a second number of signal components. The second number is equivalent to the number of interference cancellation taps. The interference power calculator is further configured to calculate a summed power of the second number of signal components. The summed power of the second number of signal components is indicative of an interference level of the received signal; The interference power calculator is further configured to determine whether the summed power of the second number of signal components exceeds a pre-determined interference threshold. The interference power management module configured to: in response to determining that the summed power of the second number of signal components does not exceed the pre-determined interference threshold, send a second turn-off indication to turn off the interference cancellation filter.

Embodiments described herein provide a system for interference cancellation power saving management at a cable transceiver. The system includes an interference cancellation filter having a number of interference cancellation taps, an interference power calculator and an interference power management module. The interference cancellation filter is configured to cancel electric magnetic interference components from a received signal. The interference power calculator is configured to: obtain, an interference response signal having a number of signal components, the number being equivalent to the number of interference cancellation taps, calculate a summed power of the number of signal components indicative of an interference level of the received signal, and determine whether the summed power of the number of signal components exceeds a pre-determined interference threshold. The interference power management module configured to: in response to determining that the summed power of the number of signal components does not exceed the pre-determined interference threshold, send a turn-off indication to turn off the interference cancellation filter.

In some implementations, the system includes a receiver that is configured to receive the received signal having the electric magnetic interference components from the data communication link. The system further includes an adaptation engine that is configured to generate the interference response signal by adapting coefficients of the received signal to minimize an energy of the electric magnetic interference components.

In some implementations, the interference power calculator is further configured, when calculating the summed power of the second number of signal components, to: calculate an absolute value or a square of a coefficient of each interference cancellation tap; and sum the absolute value or the square for all interference cancellation taps.

In some implementations, the interference power management module is further configured to periodically send a turn-on indication to temporarily turn on the interference cancellation filter. The interference power calculator is further configured to determine whether the summed power of the second number of signal components corresponding to a newly received signal exceeds the pre-determined interference threshold. The interference power management module is further configured to: in response to determining that the summed power of the second number of signal components corresponding to the newly received signal does not exceed the pre-determined interference threshold, send the second turn-off indication to turn off the interference cancellation filter. In response to determining that the summed power of the second number of signal components corresponding to the newly received signal exceeds the pre-determined interference threshold, the interference power management module is configured to keep the interference cancellation filter in operation.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

Figure 1:
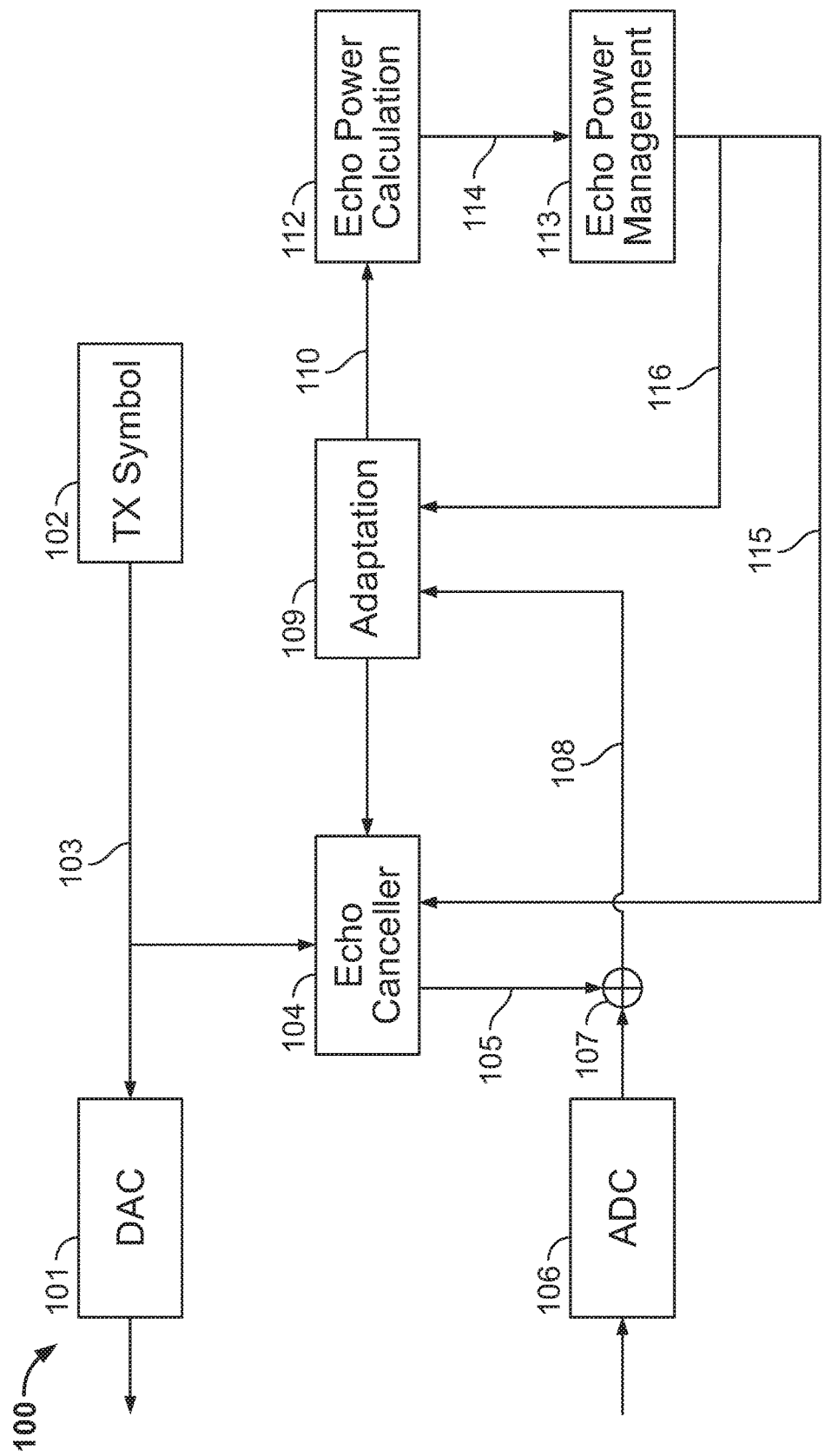
FIG. 1 is a block diagram illustrating an example circuit architecture for echo cancellation power-saving management, according to some embodiments described herein.

This disclosure describes methods and systems for echo or interference cancellation power-saving management in a cable communication system by determining whether the echo level or the interference level in the cable communication system is tolerable, and then turning off the echo or interference cancellation block to save power when the echo or interference is tolerable.

In a high speed Ethernet communication system, an echo cancellation block is usually configured to cancel the effect of echo noise from reflected signal components. The echo cancellation block includes a number of echo taps, e.g., a number of shift registers, each of which are used to delay the received signal by a small time increment. The number of echo taps within the echo cancellation block determines the extent of the echo delay that can be cancelled by the echo cancellation block. For a relatively long cable, a relatively large number of echo taps is required. For example, for a ten-meter cable connection, 100 echo taps are required at the transceiver to cancel echo noise; and for a one-meter cable connection, only ten echo taps are needed. Thus, in high speed Ethernet communication systems, inasmuch as a comparatively large echo cancellation block containing a large number of echo taps consumes more power in comparison to a smaller echo cancellation bloc containing a smaller number of echo taps, use of a a longer cable typically consumes more power in comparison to use of a shorter cable.

Some embodiments described herein include a power-saving management mechanism that is configured to turn off unnecessary echo taps that are not required for suitable echo cancellation. For example, a transceiver is usually designed to cover the maximum length of cable connections supported by the specification of the transceiver, and thus is configured with a maximum number of echo taps in the echo cancellation block corresponding to the maximum length cable. However, much of the time the transceiver is operated on cable connections that are shorter than a half of the maximum length. In order to reduce power, the power-saving management mechanism is configured to selectively turn off unnecessary echo taps in the echo cancellation block, in accordance with embodiments described herein.

Similarly, an interference cancellation block is configured to cancel EMI that degrades the performance of the high-speed communication system. The interference cancellation block is also power consuming circuitry. At times, however, there is no strong EMI within s communication system, such as an automotive operation environment. In order to reduce power, the power-saving management mechanism is thus configured to selectively turn off the interference cancellation block when the EMI level is lower than a pre-determined interference threshold, in accordance with embodiments described herein.

In this way, a transceiver, in accordance with an embodiment of the disclosure, is configured to save power as well as to keep high echo and/or EMI performance (low echo/EMI noise), and also to retain the capability of providing echo cancellation for long cable connections.

FIG. 1 is a block diagram illustrating an example structure for echo cancellation power-saving management, according to some embodiments described herein. Diagram 100 is implemented at a suitably configured transceiver, which typically includes, but not limited to a DSP transceiver, in an embodiment. Diagram 100 can also be configured to be implemented with an ASIC or programmable processor. The transceiver includes a transmitter component that is configured to obtain data symbols 103 to transmit from a transmitter symbol generator 102, and in one implementation, all the data symbols 103 are converted to an analog signal at a digital-to-analog converter (DAC) 101. The converted analog signal is then transmitted from DAC 101 via a communication link, e.g., an Ethernet cable for example.

The transceiver includes a receiver component that is configured to receive a signal and then convert the received signal, via the analog-to-digital converter (ADC) 104, into a digital form 107. The received signal 107 (in the digital form) includes a signal that is sent from a far-end transmitter, mixed with a reflection or echo signal component, which is caused by reflection of the transmitted signal (from DAC 101) at impedance mismatches along the communication link.

The transceiver further includes an echo canceller 104, which includes a number of echo taps (not shown) to delay an input signal. The echo canceller 104 is configured to delay the transmitted signal 103, which takes a form as a series of discrete-time signals from the transmission symbols generator 102, to generate a delayed signal 105, which approximates the reflection signal in response to the transmitted signal. Thus, the delayed signal 105 is subtracted from the received signal 107 to cancel echo signal components from the received signal 107, which results in echo-cancelled signal 108. The echo-cancelled signal 108 is then provided to an adaptation engine 109, at which the echo coefficients of signal 108 are adapted accordingly to generate an echo response signal 110. For example, in an embodiment, the adaptation engine 109 is configured to adapt a vector of the echo coefficients, e.g., the coefficients that are chosen to multiply with the output of each tap, represented by $(C_0, C_1, \ldots, C_{N-1})$ (see each coefficient $C_0, C_1, \ldots, C_{N-1}$ in FIG. 2), to minimize the energy of an error component of the signal 108, e.g., by recursive least square error (RLS) or the least mean squared error (LMS) methods. The number of echo coefficient in the vector correspond to the total number of echo taps of the echo canceller 104 (e.g., 121-125 in FIG. 2). In one implementation, the adaptation engine 109 is configured on a programmable logic.

The transceiver further includes an echo power calculator 112 connected to an echo power management module 113. The echo power calculator 112 is configured to receive the echo response signal 110 from the adaptation engine 109, and to calculate the power of echo components in the echo response signal 110. For example, the echo response signal 110 includes a number of echo signal components corresponding to the number of echo taps at the echo canceller 104. When the cable length is relatively short or the remote return loss is low, signal power from the tail echo taps (e.g., the last few echo taps such as 121-123, etc.) of the echo canceller 104 typically is relatively smaller. The echo power calculator 112 is configured to calculate echo power of echo components of the echo response signal 110 from the tail to the head of the echo taps. When the power of the tail part of the echo taps, e.g., the sum of signal powers of the tail echo taps such as 121-123, etc., is smaller than a pre-determined echo threshold, it often implies that activation of the tail part of the echo taps is unnecessary to achieve acceptable echo cancellation. For instance, the length of the cable connection may be relatively short and not all echo taps are be required in order to achieve a suitable level of echo cancellation. The echo power calculator 112 is then configured to send the calculated echo powers to the echo power management module 113, which is in turn configured to send a turn-off signal 115 to the echo canceller to turn off the corresponding tail part of echo taps. The echo power management module 113 is also configured to send another turn-off signal 116 to the adaptation engine 109 to turn off corresponding taps within the adaptation engine 109. For example, in response to the turn-off signal 116, the adaptation engine 109 is configured to only include echo coefficients that correspond to echo taps that are not turned off into the vector of echo coefficients for adaptation. Further detail of determining whether the tail part of echo taps is to be turned off is discussed in connection with FIG. 4.

Figure 2:
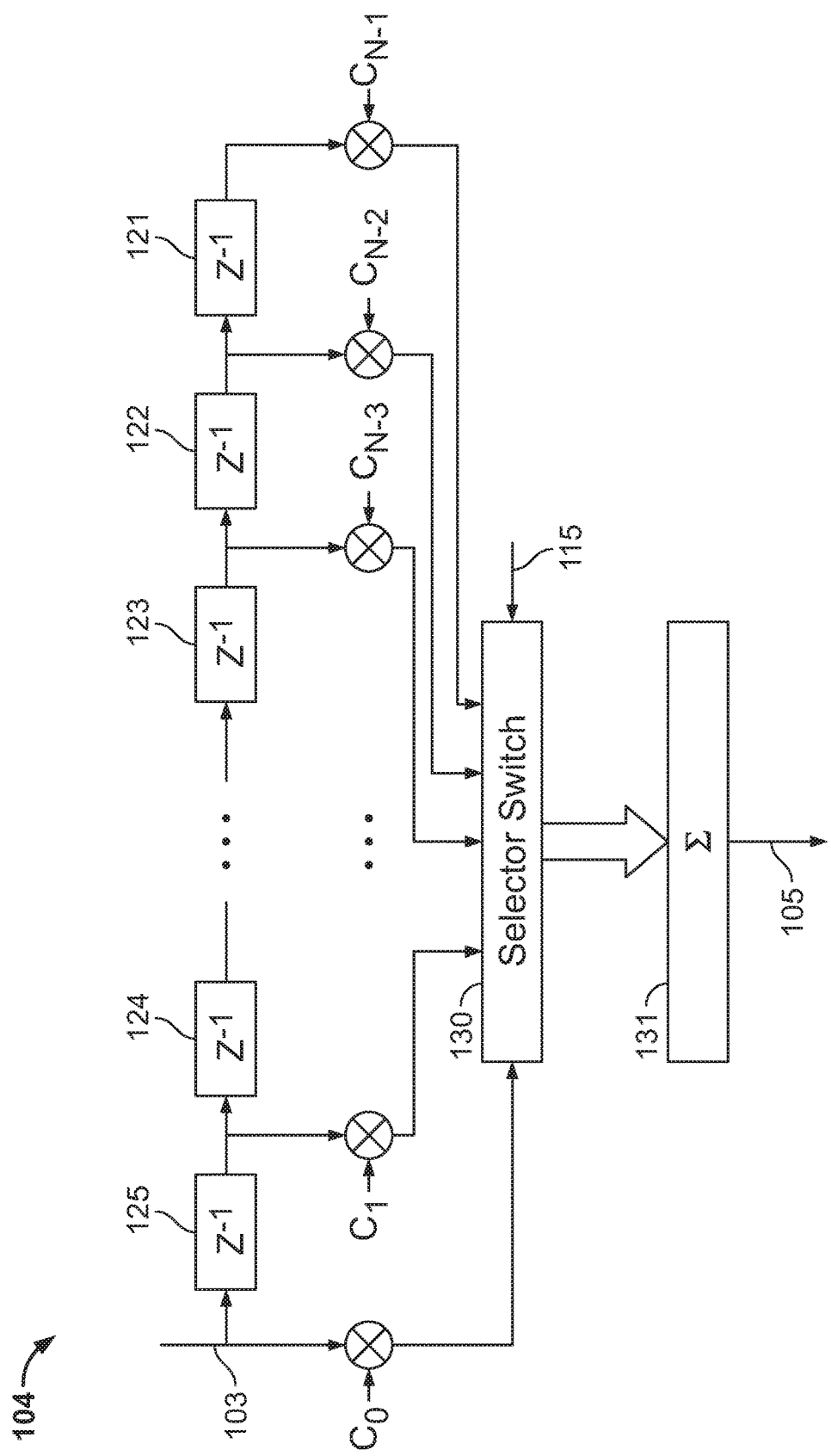
FIG. 2 is a block diagram illustrating an example circuit architecture of the echo canceller as part of the circuit shown in FIG. 1, according to some embodiments described herein.

FIG. 2 is a block diagram illustrating an example circuit architecture of the echo canceller as part of the circuit shown in FIG. 1, according to some embodiments described herein. The echo canceller 104 depicted in FIG. 2 includes a number of sequentially connected registers 121-125, i.e., the echo taps, each of which is used to incrementally delay the signal 103 by a small time increment. The output of each echo taps 121-125 is then multiplied with a coefficient, e.g., $C_0, C_1, \ldots, C_{N-1}$, respectively, and then sent to a selector switch 130. The selector switch 130 is configured to receive the turn-off signal 115 from the echo power management block 113 in FIG. 1.

For example, when the turn-off signal 115 indicates that the tail part of the echo taps, e.g., taps that are of higher order such as 121-123, are to be turned off, the selector switch 115 is configured to turn off these echo taps (e.g., 121-123, etc.). In this way, the output signal 105 from the summation block does not include any outputs from echo taps 121-123. It is noted that FIG. 2 shows three echo taps 121-123 as the tail part to be turned off for illustrative purpose only, and the number of echo taps to be turned off is determined by calculating the sum of power of the echo taps, in an embodiment, as further discussed in FIG. 5.

Figure 3:
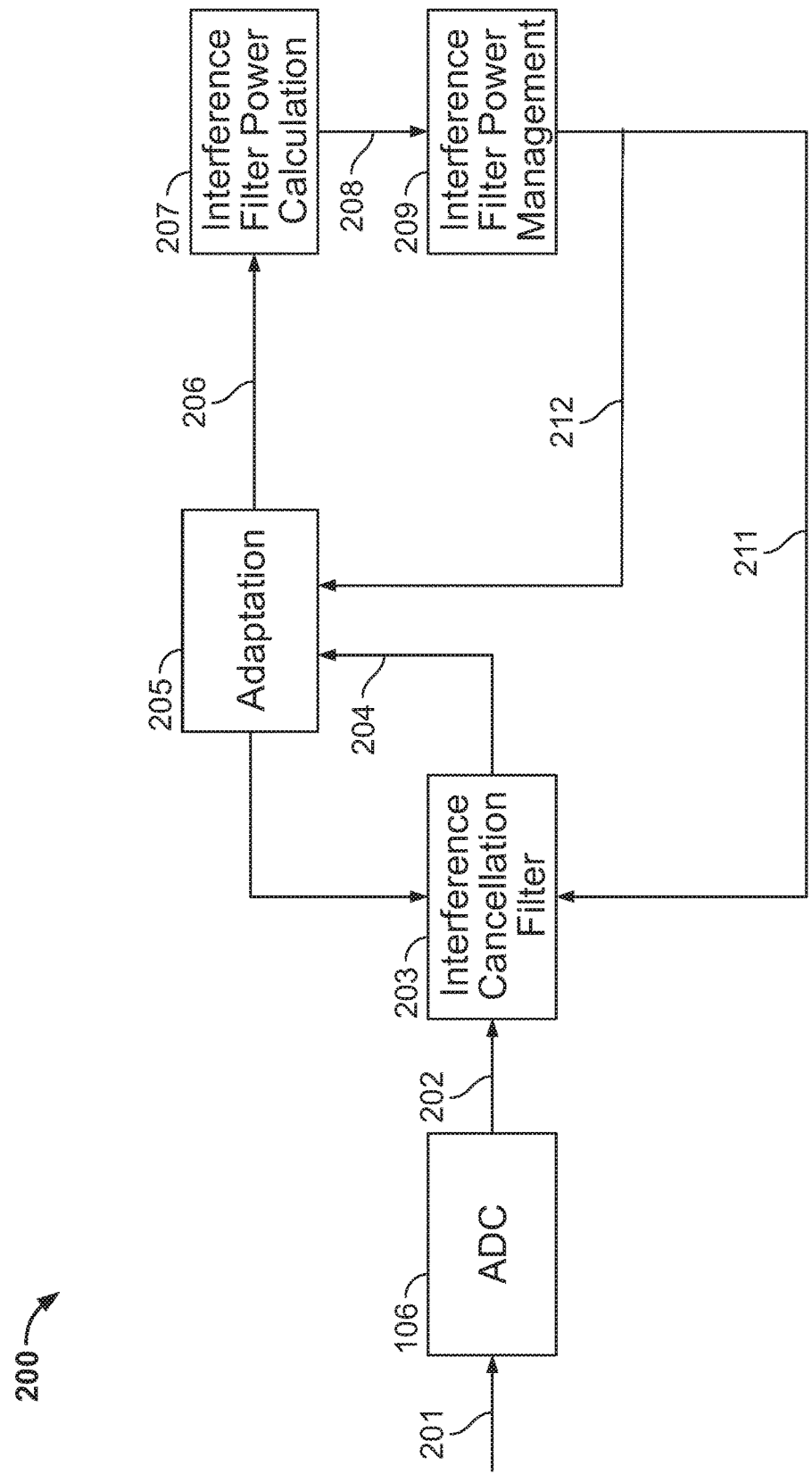
FIG. 3 is a block diagram illustrating an example circuit architecture (that is integrated with or separate from the circuit architecture in FIG. 1) for interference cancellation power-saving management, according to some embodiments described herein.

FIG. 3 is a block diagram illustrating an example structure for interference cancellation power-saving management device, according to some embodiments described herein. The device depicted in diagram 200 may be implemented in parallel to the echo cancellation power-saving mechanism at the same suitably configured transceiver shown in FIG. 1, in an embodiment. Alternatively, the device of diagram 200 may be implemented as a separate system that is independent of the echo cancellation power-saving mechanism shown in FIG. 1.

Similar to the ADC 106 shown in FIG. 1, ADC 106 shown in FIG. 2 is configured to receive an analog signal 201 from a communication link, e.g., a cable connection, and convert the analog signal 201 into a digital signal 202. The digital signal 202 includes a signal component that is transmitted from a far-end transceiver, and a signal component indicative of EMI along the communication link. The digital signal 202 is then fed to an interference cancellation filter 203, which includes a number of interference filter taps, to cancel the interference noise components to obtain an interference-cancelled signal 204, which is then fed to the adaptation engine 205. The adaptation engine 205 is configured to adapt the interference coefficients of the signal 204, e.g., in a similar manner as the adaptation engine 109 adapting the echo coefficients. The output of the adaptation engine 205, which includes a number of interference components 206 corresponding to the number of interference filter taps of the interference cancellation filter 203, is passed on to the interference filter power calculator 207.

The interference filter power calculator 207 is configured to calculate the total power of the number of interference components 206, e.g., by taking the sum of the absolute value or the square of the coefficient of each interference component. The calculated power 208 is transmitted to the interference filter power management module 209, which is configured to determine whether the total power of interference 208 exceeds a pre-determined interference threshold. If the total power of interference 208 does not exceed the pre-determined interference threshold, indicating there is no strong EMI, the interference filter power management module 209 is configured to send a turn-off signal 211 to turn off the interference cancellation filter 203, and to send a turn-off signal 212 to turn off the adaptation engine 205. Further detail of determining whether to turn off the interference cancellation filter is discussed in connection with FIG. 5.

Figure 4:
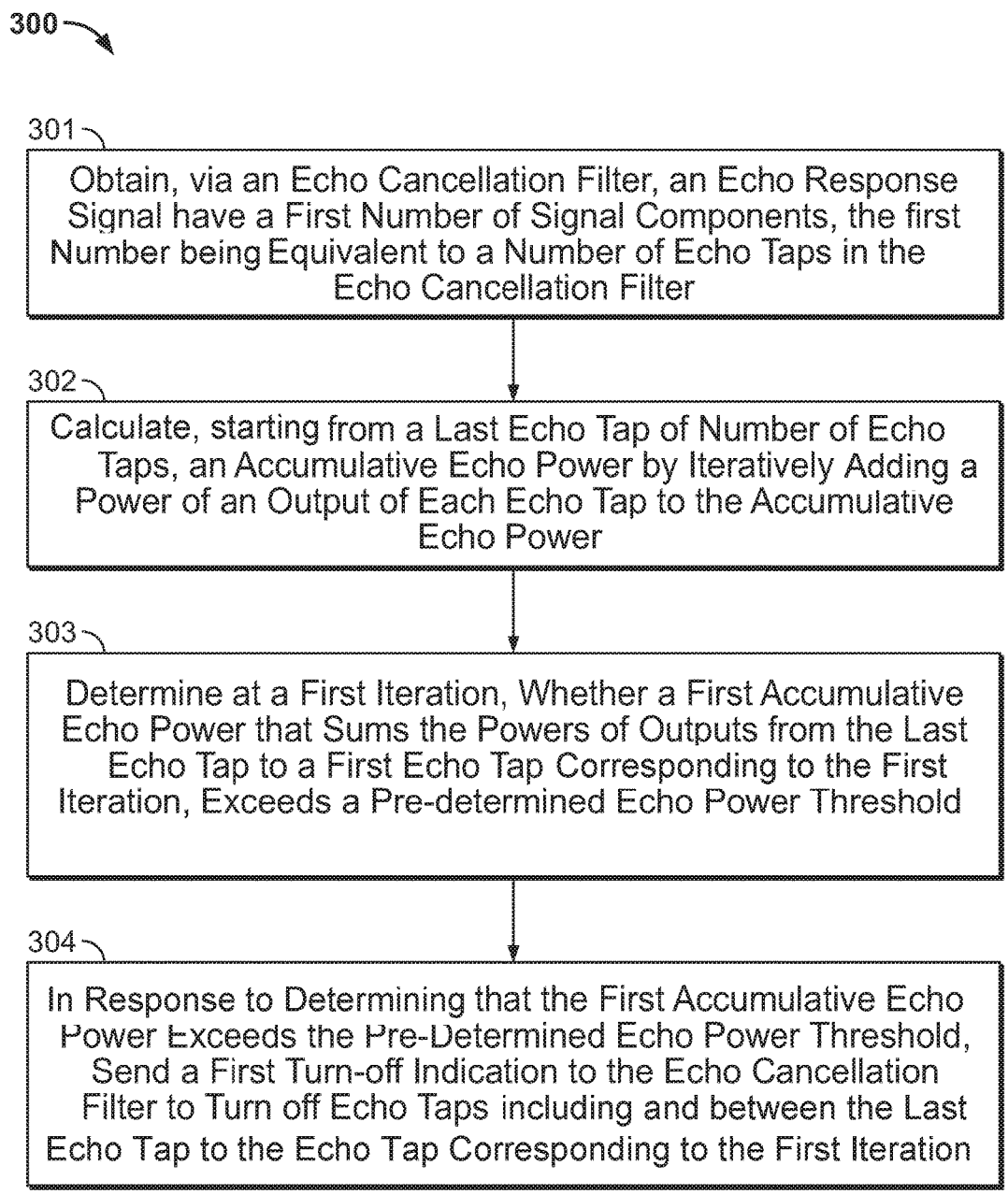
FIG. 4 provides an example logic flow diagram illustrating aspects of an echo cancellation power-saving management process, which is implemented via the circuit architecture illustrated in FIG. 1, according to some embodiments described herein.

FIG. 4 provides an example logic flow diagram illustrating aspects of an echo cancellation power-saving management process, according to some embodiments described herein. The echo cancellation power-saving management process 300 can be implemented at the DSP transceiver illustrated by diagram 100 in FIG. 1. At 301, an echo response signal (e.g., signal 110 in FIG. 1) is obtained via an echo cancellation filter (e.g., echo canceller 104 in FIG. 1). The echo response signal includes a first number of signal components, each of which is generated from an echo tap in the echo canceller 104. Thus, the first number of signal components is equivalent to the number of echo taps in the echo cancellation filter (e.g., the echo canceller 104). For example, if the echo cancellation filter has ten echo taps, the echo response signal has ten echo signal components accordingly.

At 302, an accumulative echo power is calculated, starting from the last echo tap of the number of echo taps, by iteratively adding the power of an output of each echo tap to the accumulative echo power. For example, the power of an output of each echo tap is calculated as the absolute value or the square of the coefficient of the output. At 303, at a first iteration, it is determined whether a first accumulative echo power that sums the powers of outputs from the last echo tap to a first echo tap corresponding to the first iteration, exceeds a pre-determined echo power threshold. The iterative calculation at 303 is further discussed in FIG. 4. At 304, in response to determining that the first accumulative echo power exceeds the pre-determined echo power threshold, a first turn-off indication (e.g., signal 115 in FIG. 1) is sent to the echo cancellation filter (e.g., echo canceller 104 in FIG. 1) to turn off echo taps including and between the last echo tap to the first echo tap.

Figure 5:
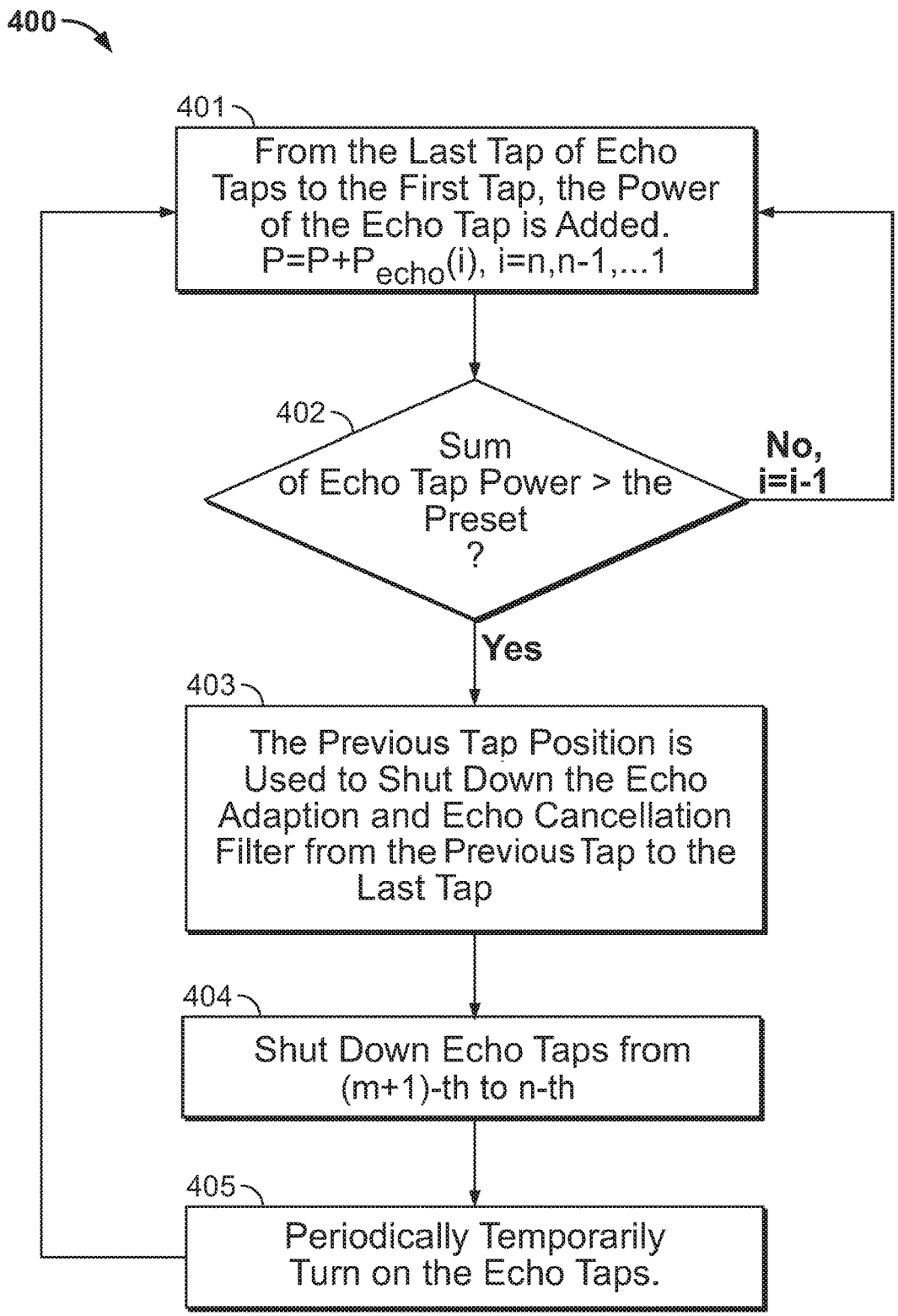
FIG. 5 provides an example logic flow diagram illustrating aspects of a technique for iteratively determining one or more echo taps to be turned off to save power for echo cancellation, which is implemented via the circuit architecture illustrated in FIG. 1, according to some embodiments described herein.

FIG. 5 provides an example logic flow diagram 400 illustrating aspects of iteratively determining one or more echo taps to be turned off to save power for echo cancellation, according to some embodiments described herein. Diagram 400 provides further detail to block 303 in FIG. 3. If an echo response signal (e.g., signal 110 in FIG. 1) including a number n of echo components corresponding to the number n of echo taps, the power of the echo tap is added from the last tap, e.g., the n-th tap. For example, at each iteration, at 401, the power of the echo tap is calculated as: Power from the n-th tap to the i-th tap=Power from the n-th tap to the (i+1)th tap+$P_{echo}(i)$, i=n, n−1, . . . 1, wherein $P_{echo}(i)$ denotes the power of the coefficient of the i-th echo tap, which is calculated as the absolute value or the square of the coefficient.

At 402, the sum of echo tap power, e.g., the power from the n-th tap to the i-th tap, is compared with a pre-determined echo threshold. If the sum of echo tap power does not exceed the echo threshold, the calculation goes back to 401 to include another echo tap. If the sum of echo tap power exceeds the echo threshold, the previous tap position (e.g., the tap position corresponding to the iteration prior to the current iteration) is used to shut down the echo adaptation engine and the echo cancellation filter from the current tap to the last tap. For example, if the sum of echo tap power from the last tap, e.g., the n-th tap, to the m-th tap, exceeds the pre-determined echo threshold, the echo taps from the (m+1)-th tap to the n-th tap are to be shut down at 404. At 405, an echo power management module (e.g., block 113 in FIG. 1) is configured to periodically turn on all the echo taps at the cancellation filter, temporarily. In this way, the echo power management module is configured to repeat from 401 to 404 to monitor whether the condition of cable connection has changed (e.g., experiencing more echo, etc.), the echo taps to be shut down or keep in operation are in turn adjusted.

Figure 6:
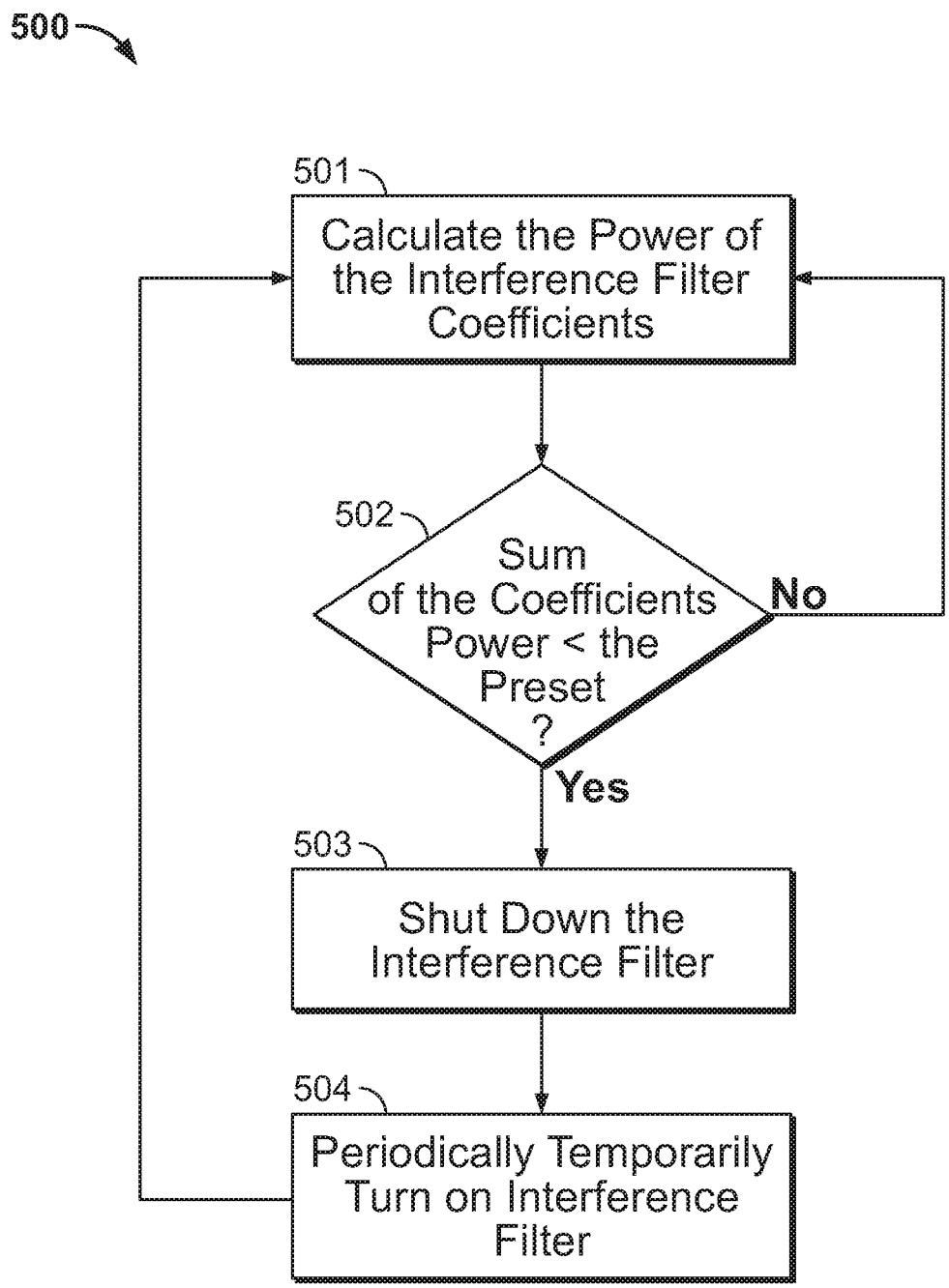
FIG. 6 provides an example logic flow diagram illustrating aspects of a technique for determining whether to turn off an interference filter to save power for interference cancellation, which is implemented via the circuit architecture illustrated in FIG. 2, according to some embodiments described herein.

FIG. 6 provides an example logic flow diagram 500 illustrating aspects of determining whether to turn off an interference filter to save power for interference cancellation, according to some embodiments described herein. Process 500 can be implemented at the transceiver illustrated by diagram 200 in FIG. 2. At 501, the power of the interference filter coefficients (e.g., signal components 206 in FIG. 2) are calculated, e.g., by taking the absolute value or the square of each interference coefficient. At 502, the total sum of the power of the interference filter coefficients is compared with a pre-determined interference threshold. If the total sum of the power of the interference filter coefficients does not exceed the pre-determined interference threshold, process 500 goes back to 501 to keep monitoring the power of the interference filter coefficients. If the total sum of the power of the interference filter coefficients does not exceed the pre-determined interference threshold, the interference filter (e.g., block 203 in FIG. 2) is shut down at 503. At 504, the interference filter is periodically and temporarily turned on, and process 500 repeats 501-503 to monitor the interference level of the communication system such that the interference filter is to be shut down again, or kept in operation, depending on the interference level.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed, to achieve the desirable results.

The subject matter of this specification has been described in terms of particular aspects, but other aspects can be implemented and are within the scope of the following claims. For example, the actions recited in the claims can be performed in a different order and still achieve desirable results. As one example, the processes depicted in FIGS. 4-6 do not necessarily require the particular order shown, or sequential order, to achieve desirable results. In certain implementations, multitasking and parallel processing may be advantageous. Other variations are within the scope of the following claims.

What is claimed is:

1. A method for echo cancellation power saving management at a cable transceiver, the method comprising:
   obtaining, via an echo cancellation filter, an echo response signal having a first number of signal components, the first number being equivalent to a number of echo taps in the echo cancellation filter;
   at a first iteration for calculating a first accumulative echo power:

identifying a respective echo tap that corresponds to the first iteration;
calculating the first accumulative echo power for the respective iteration by summing powers of outputs from a last echo tap to the respective echo tap;
determining whether the first accumulative echo power, exceeds a pre-determined echo power threshold; and
in response to the determining that the first accumulative echo power exceeds the pre-determined echo power threshold, sending a first turn-off indication to the echo cancellation filter to turn off all echo taps including and between the last echo tap to the first echo tap.

2. The method of claim 1, further comprising:
transmitting a first signal to a data communication link;
in response to the transmitting, receiving a second signal including echo components corresponding to the first signal from the data communication link;
generating, by the echo cancellation filter, an echo estimate based on the first signal to cancel the echo components from the second signal; and
generating, by an adaptation engine, the echo response signal by adapting coefficients of echo components of the second signal to minimize an energy of the echo components.

3. The method of claim 2, further comprising:
in response to determining that the first accumulative echo power exceeds the pre-determined echo threshold, sending a second turn-off indication to turn off taps of the adaptation engine corresponding to echo taps including and between the last echo tap to the first echo tap.

4. The method of claim 1, wherein calculating an accumulative echo power comprises:
calculating an absolute value of a coefficient of an echo tap as the power of the echo tap.

5. The method of claim 1, wherein calculating an accumulative echo power comprises:
calculating a square value of a coefficient of an echo tap as the power of the echo tap.

6. The method of claim 1, further comprising:
periodically sending a turn-on indication to temporarily turn on all echo taps of the echo cancellation filter;
iteratively calculating a second accumulative echo power based on a newly obtained echo response signal by:
at a second iteration for calculating the second accumulative echo power:
identifying a second echo tap that corresponds to the second iteration;
calculating the second accumulative echo power for the second iteration by summing powers of outputs from the last echo tap to the second echo tap;
determining whether the second accumulative echo power, exceeds the pre-determined echo power threshold
and
sending an indication to adjust the echo cancellation filter in a way that all echo taps including and between the last echo tap to the second echo tap are turned off.

7. The method of claim 1, further comprising:
sending a received signal to an interference cancellation filter to cancel electric magnetic interference components;
obtaining, an interference response signal having a second number of signal components indicative of interference in the received signal, the second number being equivalent to a number of interference cancellation taps in the interference cancellation filter;
calculating a summed power of the second number of signal components, wherein the summed power of the second number of signal components is indicative of an interference level of the received signal;
determining whether the summed power of the second number of signal components exceeds a pre-determined interference threshold;
in response to determining that the summed power of the second number of signal components does not exceed the pre-determined interference threshold, sending a second turn-off indication to turn off the interference cancellation filter.

8. The method of claim 7, wherein calculating the summed power of the second number of signal components comprises:
calculating an absolute value or a square of a coefficient of each interference cancellation tap; and
summing the absolute value or the square for all interference cancellation taps.

9. The method of claim 7, further comprising:
periodically sending a turn-on indication to temporarily turn on the interference cancellation filter;
determining whether the summed power of the second number of signal components corresponding to a newly received signal exceeds the pre-determined interference threshold;
in response to determining that the summed power of the second number of signal components corresponding to the newly received signal does not exceed the pre-determined interference threshold, sending the second turn-off indication to turn off the interference cancellation filter; and
in response to determining that the summed power of the second number of signal components corresponding to the newly received signal exceeds the pre-determined interference threshold, keeping the interference cancellation filter in operation.

10. The method of claim 7, further comprising:
performing interference cancellation power management in parallel to echo cancellation power management.

11. A system for echo cancellation power saving management at a cable transceiver, the system comprising:
an echo cancellation filter having a number of echo taps, the echo cancellation filter configured to provide an echo response signal having a first number of signal components, the first number being equivalent to the number of echo taps;
an echo power calculator configured to:
at a first iteration for calculating a first accumulative echo power:
identify a respective echo tap that corresponds to the first iteration,
calculate the first accumulative echo power for the respective iteration by summing powers of outputs from a last echo tap to the respective echo tap, and
determine whether the first accumulative echo power, exceeds a pre-determined echo power threshold; and
an echo power management module configured to:
in response to the determining that the first accumulative echo power exceeds the pre-determined echo power threshold, send a first turn-off indication to the echo cancellation filter to turn off echo taps including and between the last echo tap to the first echo tap.

12. The system of claim 11, further comprising:
a transmitter configured to transmit a first signal to a data communication link;
a receiver configured to, in response to the transmitting, receive a second signal including echo components corresponding to the first signal from the data communication link;
wherein the echo cancellation filter is further configured to generate an echo estimate based on the first signal to cancel the echo components from the second signal; and
an adaptation engine configured to generate the echo response signal by adapting coefficients of echo components of the second signal to minimize an energy of the echo components.

13. The system of claim 12, wherein the echo power management module is further configured to:
in response to determining that the first accumulative echo power exceeds the pre-determined threshold, send a second turn-off indication to turn off taps of the adaptation engine corresponding to echo taps including and between the last echo tap to the first echo tap.

14. The system of claim 11, wherein the echo power calculator is further configured, when calculating an accumulative echo power, to:
calculate an absolute value or a square of a coefficient of an echo tap as the power of the echo tap.

15. The system of claim 11, wherein the echo power management module is further configured to periodically send a turn-on indication to temporarily turn on the echo cancellation filter,
the echo power calculator is further configured to:
iteratively calculate the accumulative echo power based on a newly obtained echo response signal by:
at a second iteration for calculating the second accumulative echo power:
identifying a second echo tap that corresponds to the second iteration,
calculating the second accumulative echo power for the second iteration by summing powers of outputs from the last echo tap to the second echo tap, and
determining whether the second accumulative echo power, exceeds the pre-determined echo power threshold; and
the echo power management module is further configured to send an indication to adjust the echo cancellation filter in a way that all echo taps including and between the last echo tap to the second echo tap are turned off.

16. The system of claim 11, further comprising:
an interference cancellation filter having a number of interference cancellation taps, the interference cancellation filter being configured to cancel electric magnetic interference components from a received signal;
an interference power calculator configured to:
obtain, an interference response signal having a second number of signal components, the second number being equivalent to the number of interference cancellation taps,
calculate a summed power of the second number of signal components, wherein the summed power of the second number of signal components is indicative of an interference level of the received signal; and
determine whether the summed power of the second number of signal components exceeds a pre-determined interference threshold;
an interference power management module configured to:
in response to determining that the summed power of the second number of signal components does not exceed the pre-determined interference threshold, send a second turn-off indication to turn off the interference cancellation filter.

17. A system for interference cancellation power saving management at a cable transceiver, the system comprising:
an interference cancellation filter having a number of interference cancellation taps, the interference cancellation filter being configured to cancel electric magnetic interference components from a received signal;
an interference power calculator configured to:
obtain, an interference response signal having a number of signal components, the number being equivalent to the number of interference cancellation taps,
calculate a summed power of the number of signal components indicative of an interference level of the received signal, and
determine whether the summed power of the number of signal components exceeds a pre-determined interference threshold;
an interference power management module configured to:
in response to the determining that the summed power of the number of signal components does not exceed the pre-determined interference threshold, send a turn-off indication to turn off the interference cancellation filter.

18. The system of claim 17, further comprising:
a receiver configured to receive the received signal having the electric magnetic interference components from the data communication link; and
an adaptation engine configured to generate the interference response signal by adapting coefficients of the received signal to minimize an energy of the electric magnetic interference components.

19. The system of claim 17, wherein the interference power calculator is further configured, when calculating the summed power of the second number of signal components, to:
calculate an absolute value or a square of a coefficient of each interference cancellation tap; and
sum the absolute value or the square for all interference cancellation taps.

20. The system of claim 17, wherein the interference power management module is further configured to periodically send a turn-on indication to temporarily turn on the interference cancellation filter;
wherein the interference power calculator is further configured to determine whether the summed power of the second number of signal components corresponding to a newly received signal exceeds the pre-determined interference threshold;
wherein the interference power management module is further configured to:
in response to determining that the summed power of the second number of signal components corresponding to the newly received signal does not exceed the pre-determined interference threshold, send the second turn-off indication to turn off the interference cancellation filter; and in response to determining that the summed power of the second number of signal components corresponding to the newly received signal exceeds the pre-determined interference threshold, keep the interference cancellation filter in operation.

* * * * *